US008511384B2

(12) United States Patent
Valdez (10) Patent No.: US 8,511,384 B2
(45) Date of Patent: Aug. 20, 2013

(54) METHODS FOR PRODUCING OIL AND/OR GAS (75) Inventor: Raul Valdez, Bellaire, TX (US)

(73) Assignee: Shell Oil Company, Houston, TX (US)

(*) Notice: Subject to any disclaimer, the term of this patent is extended or adjusted under 35 U.S.C. 154(b) by 150 days.

(21) Appl. No.: 12/175,936

(22) Filed: Jul. 18, 2008

(65) Prior Publication Data
US 2009/0056941 A1 Mar. 5, 2009

Related U.S. Application Data (60) Provisional application No. 60/950,718, filed on Jul. 19, 2007, provisional application No. 60/747,908, filed on May 22, 2006.

(51) Int. Cl.
E21B 43/22 (2006.01)
(52) U.S. Cl.
USPC .......................... 166/309; 166/403
(58) Field of Classification Search
None
See application file for complete search history.

(56) References Cited

U.S. PATENT DOCUMENTS

| 2,330,934 A | 10/1943 | Thacker | 23/206 |
|---|---|---|---|
| 2,428,727 A | 10/1947 | Thacker | 23/206 |
| 2,492,719 A | 12/1949 | Thacker | 23/206 |
| 2,636,810 A | 4/1953 | Marisic | 23/206 |
| 2,670,801 A | 3/1954 | Sherborne | 166/21 |
| 2,833,711 A | 5/1958 | Arnold | 252/8.55 |
| 3,070,162 A | 12/1962 | Bernard, Jr. | 166/38 |
| 3,087,788 A | 4/1963 | Porter | 23/181 |
| 3,345,135 A | 10/1967 | Kerr et al. | 23/206 |
| 3,366,452 A | 1/1968 | Wynne | 23/204 |
| 3,393,733 A | 7/1968 | Kuo et al. | 166/8 |
| 3,402,768 A | 9/1968 | Felsenthal | |
| 3,415,573 A | 12/1968 | Fraser | 299/4 |
| 3,445,181 A | 5/1969 | Every et al. | 23/2 |
| 3,498,378 A | 3/1970 | Stone et al. | 166/263 |
| 3,581,821 A | 6/1971 | Ross | 166/245 |
| 3,647,906 A | 3/1972 | Farley | 260/683 D |
| 3,672,448 A | 6/1972 | Hoyt | 166/245 |
| 3,699,215 A | 10/1972 | Gerin et al. | 423/443 |
| 3,724,552 A | 4/1973 | Snavely, Jr. | 166/304 |
| 3,724,553 A | 4/1973 | Snavely, Jr. et al. | 166/304 |
| 3,729,053 A | 4/1973 | Froning | 166/304 |
| 3,754,598 A | 8/1973 | Holloway, Jr. | 166/249 |

(Continued)

FOREIGN PATENT DOCUMENTS

EP 0581026 A1 2/1994
FR 1461303 11/1966

(Continued)

OTHER PUBLICATIONS

Kirk-Othermer Encyclopedia of Chem Technology, $3^{rd}$ Ed., vol. 4, 1978; pp. 747-749.

(Continued)

Primary Examiner — Zakiya W Bates (57) ABSTRACT

A method for producing oil and/or gas comprising a method for producing oil from an underground formation comprising injecting an enhanced oil recovery formulation and a gas into a first well in the formation; forming a mixture comprising the enhanced oil recovery formulation and the oil in the formation; forming a gas cap with the injected gas; forcing the formulation and oil mixture towards a second well in the formation; and producing the formulation and oil mixture from the second well.

18 Claims, 9 Drawing Sheets

(56) References Cited

U.S. PATENT DOCUMENTS

| | | | |
|---|---|---|---|
| 3,794,114 A | 2/1974 | Brandon | 166/249 |
| 3,805,892 A | 4/1974 | Haynes, Jr. | 166/245 |
| 3,822,748 A | 7/1974 | Allen et al. | 166/269 |
| 3,823,777 A | 7/1974 | Allen et al. | 166/266 |
| 3,838,738 A | 10/1974 | Redford et al. | 166/271 |
| 3,840,073 A | 10/1974 | Allen et al. | 166/274 |
| 3,847,221 A | 11/1974 | Allen et al. | 166/274 |
| 3,847,224 A | 11/1974 | Allen et al. | 166/274 |
| 3,850,245 A | 11/1974 | Allen et al. | 166/274 |
| 3,876,753 A | 4/1975 | Manganaro et al. | 423/443 |
| 3,878,892 A | 4/1975 | Allen et al. | 166/267 |
| 3,927,185 A | 12/1975 | Meadow et al. | 423/443 |
| 3,983,939 A | 10/1976 | Brown | 166/269 |
| 4,008,764 A | 2/1977 | Allen | 166/266 |
| 4,042,029 A * | 8/1977 | Offeringa | 166/401 |
| 4,057,613 A | 11/1977 | Meadow et al. | 423/443 |
| 4,073,868 A | 2/1978 | Meadow et al. | 423/443 |
| 4,109,720 A | 8/1978 | Allen et al. | 166/269 |
| 4,122,156 A | 10/1978 | Kittrell et al. | 423/443 |
| 4,158,467 A | 6/1979 | Larson et al. | 299/2 |
| 4,182,416 A | 1/1980 | Trantham et al. | 166/245 |
| 4,299,286 A | 11/1981 | Alston | 166/274 |
| 4,305,463 A | 12/1981 | Zakiewicz | 106/245 |
| 4,393,937 A | 7/1983 | Dilgren et al. | 166/272 |
| 4,476,113 A | 10/1984 | Young et al. | 424/161 |
| 4,488,976 A | 12/1984 | Dilgren et al. | 252/8.55 D |
| 4,543,434 A | 9/1985 | Chang | 585/310 |
| 4,773,484 A | 9/1988 | Chang et al. | 166/274 |
| 4,822,938 A | 4/1989 | Audeh et al. | 585/324 |
| 4,836,935 A | 6/1989 | Lilienthal | 210/788 |
| 4,963,340 A | 10/1990 | Audeh et al. | 423/444 |
| 5,065,821 A | 11/1991 | Huang et al. | 166/245 |
| 5,076,358 A | 12/1991 | Kissel | 166/275 |
| 5,097,903 A | 3/1992 | Wilensky | 166/266 |
| 5,120,935 A | 6/1992 | Nenniger | 392/305 |
| 5,267,615 A * | 12/1993 | Christiansen et al. | 166/272.2 |
| 5,304,361 A | 4/1994 | Parisi | 423/220 |
| 5,607,016 A | 3/1997 | Butler | 166/263 |
| 5,609,845 A | 3/1997 | Cimini et al. | 423/648.1 |
| 5,778,977 A * | 7/1998 | Bowzer et al. | 166/252.1 |
| 5,803,171 A | 9/1998 | McCaffery et al. | 166/245 |
| 5,826,656 A | 10/1998 | McGuire et al. | 166/305.1 |
| 6,016,868 A | 1/2000 | Gregoli et al. | 166/261 |
| 6,136,282 A | 10/2000 | Fisher | 423/220 |
| 6,149,344 A | 11/2000 | Eaton | 405/128 |
| 6,241,019 B1 | 6/2001 | Davidson et al. | 166/249 |
| 6,357,526 B1 | 3/2002 | Abdel-Halim et al. | 166/272.3 |
| 6,405,797 B2 | 6/2002 | Davidson et al. | 166/249 |
| 6,497,855 B1 | 12/2002 | Wachs | 423/648.1 |
| 6,506,349 B1 | 1/2003 | Khanmamedov | 423/210 |
| 6,706,108 B2 | 3/2004 | Polston | 106/285 |
| 6,851,473 B2 | 2/2005 | Davidson | 166/263 |
| 2001/0008619 A1 | 7/2001 | Geus et al. | 423/230 |
| 2002/0134706 A1 | 9/2002 | Keller et al. | 208/250 |
| 2003/0047309 A1 | 3/2003 | Thomas et al. | 166/265 |
| 2003/0194366 A1 | 10/2003 | Srinivas et al. | 423/230 |
| 2004/0022721 A1 | 2/2004 | Watson et al. | 423/574.1 |
| 2004/0096381 A1 | 5/2004 | Watson et al. | 423/224 |
| 2004/0146288 A1 | 7/2004 | Vinegar et al. | 392/301 |
| 2004/0146450 A1 | 7/2004 | Stauffer | 423/443 |
| 2004/0159583 A1 | 8/2004 | Mesters et al. | 208/208 |
| 2004/0189108 A1 | 9/2004 | Dooley | 310/52 |
| 2004/0256097 A1 | 12/2004 | Byrd et al. | 166/90.1 |
| 2006/0254769 A1 | 11/2006 | Wang et al. | 166/266 |
| 2006/0289157 A1 * | 12/2006 | Rao | 166/268 |
| 2007/0251686 A1 | 11/2007 | Sivrikoz et al. | 166/249 |
| 2008/0023198 A1 | 1/2008 | Hsu | 166/268 |
| 2008/0087425 A1 * | 4/2008 | Hsu et al. | 166/266 |
| 2009/0025935 A1 | 1/2009 | Van Dorp et al. | 166/335 |

FOREIGN PATENT DOCUMENTS

| | | |
|---|---|---|
| GB | 1007674 | 10/1965 |
| GB | 1173344 | 12/1969 |
| GB | 2379685 A | 3/2003 |
| SU | 1667432 | 12/1996 |
| WO | WO9850679 | 12/1998 |
| WO | WO 2007/131976 | 11/2007 |
| WO | WO 2007/131977 | 11/2007 |
| WO | WO2007137153 | 11/2007 |
| WO | WO 2008/003732 | 1/2008 |
| WO | WO2008034777 A1 | 3/2008 |

OTHER PUBLICATIONS

Petroleum Technology Transfer Council, "Application of the Gas Gun in Kansas Oil and Gas Operations", pp. 1-10.

* cited by examiner

METHODS FOR PRODUCING OIL AND/OR GAS

CROSS REFERENCE TO RELATED APPLICATIONS

The present application is a U.S. national phase application of International Application Number PCT/US2008/070311 entitled METHODS FOR PRODUCING OIL AND/OR GAS having a filing date of Jul. 17, 2008 which claims priority from U.S. Provisional Application No. 60/950,718, filed Jul. 19, 2007. The present application is related to co-pending U.S. patent application Ser. No. 11/409,436 filed on Apr. 19, 2006 and U.S. Provisional Application No. 60/747,908 filed on May 22, 2006.

FIELD OF THE INVENTION

The present disclosure relates to methods for producing oil and/or gas.

BACKGROUND OF THE INVENTION

Enhanced Oil Recovery (EOR) may be used to increase oil recovery in fields worldwide. There are three main types of EOR, thermal, chemical/polymer and gas injection, which may be used to increase oil recovery from a reservoir, beyond what can be achieved by conventional means—possibly extending the life of a field and boosting the oil recovery factor.

Thermal enhanced recovery works by adding heat to the reservoir. The most widely practiced form is a steam-drive, which reduces oil viscosity so that it can flow to the producing wells. Chemical flooding increases recovery by reducing the capillary forces that trap residual oil. Polymer flooding improves the sweep efficiency of injected water. Miscible injection works in a similar way to chemical flooding. By injecting a fluid that is miscible with the oil, trapped residual oil can be recovered.

Figure 1:
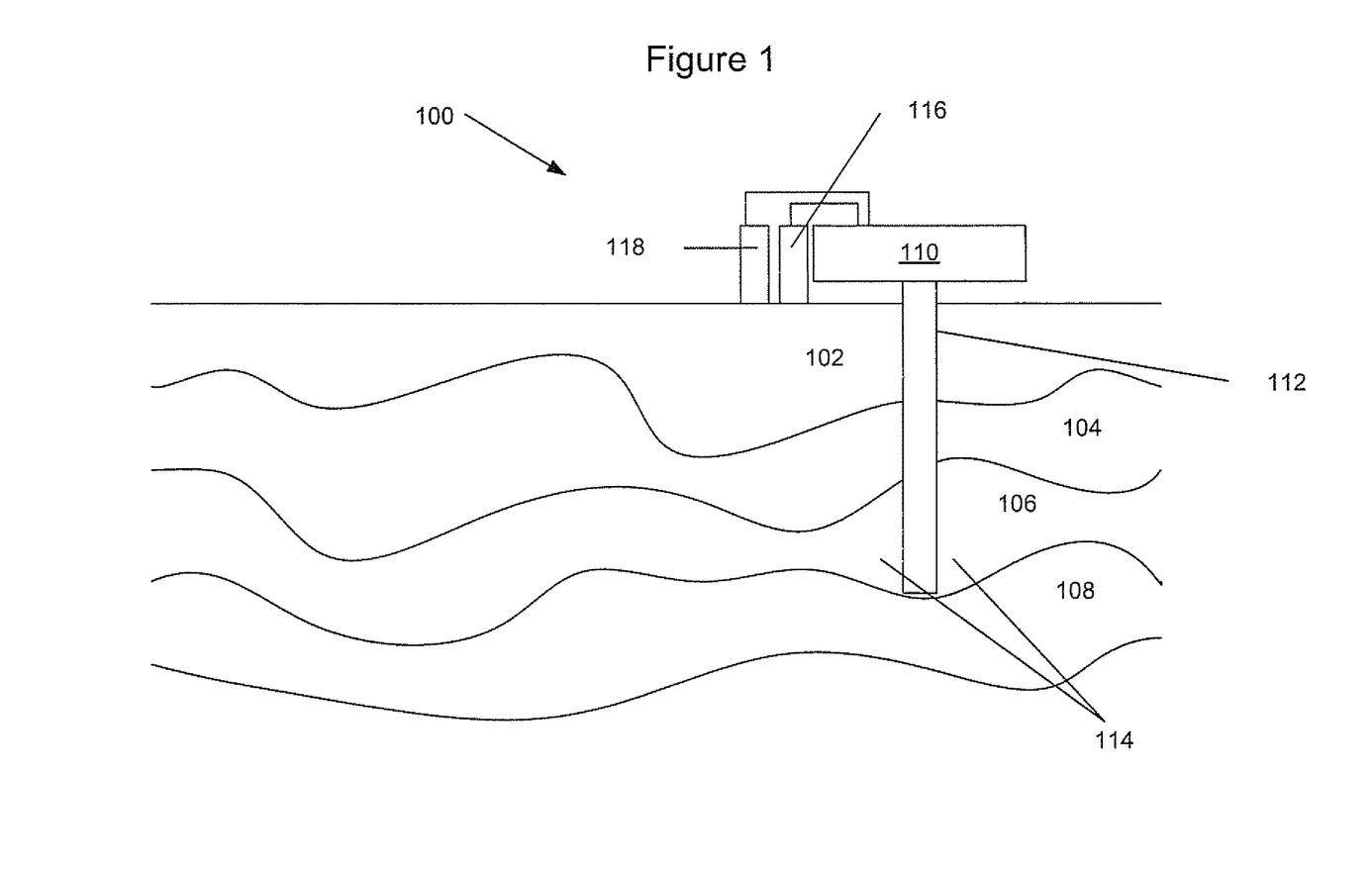
FIG. 1 illustrates an oil and/or gas production system.

Referring to FIG. 1, there is illustrated prior art system 100. System 100 includes underground formation 102, underground formation 104, underground formation 106, and underground formation 108. Production facility 110 is provided at the surface. Well 112 traverses formations 102 and 104, and has openings in formation 106. The portion of formation 106 is shown at 114. Oil and gas are produced from formation 106 through well 112, to production facility 110. Gas and liquid are separated from each other, gas is stored in gas storage 116 and liquid is stored in liquid storage 118.

U.S. Pat. No. 4,109,720 discloses that petroleum may be recovered from viscous petroleum-containing formations including tar sand deposits by injecting into the formation a solvent which is liquid at formation conditions and simultaneously therewith injecting a substance which will remain totally gaseous at the pressure and temperature conditions existing within the reservoir. The presence of noncondensible gas in the formation into which solvent is being injected prevents formation of a impermeable bitumen bank which blocks the further flow of fluids through the formation. The gas should be essentially unreactive with the solvent and formation fluids in order to obtain the desired benefits. Examples of suitable gases for the practice of this invention include methane, ethane, nitrogen, carbon dioxide, and mixtures thereof. U.S. Pat. No. 4,109,720 is herein incorporated by reference in its entirety.

There is a need in the art for improved systems and methods for enhanced oil recovery. There is a further need in the art for improved systems and methods for enhanced oil recovery using a solvent, for example through viscosity reduction, chemical effects, and miscible flooding. There is a further need in the art for improved systems and methods for solvent miscible flooding. There is a further need in the art for improved systems and methods for enhanced oil recovery with gravity drainage.

SUMMARY OF THE INVENTION

In one aspect, the invention provides a method for producing oil from an underground formation comprising injecting an enhanced oil recovery formulation and a gas into a first well in the formation; forming a mixture comprising the enhanced oil recovery formulation and the oil in the formation; forming a gas cap with the injected gas; forcing the formulation and oil mixture towards a second well in the formation; and producing the formulation and oil mixture from the second well.

In another aspect, the invention provides a method for producing oil and/or gas comprising injecting a miscible enhanced oil recovery formulation and a gas into fractures and/or vugs surrounding a matrix in a formation from a first well; imbibing the miscible enhanced oil recovery formulation and the gas into the matrix; forming an oil and miscible enhanced oil recovery formulation mixture in the matrix; forming a gas cap in the matrix with the injected gas; producing the oil and formulation mixture to the fractures and/or vugs; and producing the oil and formulation mixture from the fractures and/or vugs from a second well.

Advantages of the invention include one or more of the following:

Improved systems and methods for enhanced recovery of hydrocarbons from a formation with a solvent.

Improved systems and methods for enhanced recovery of hydrocarbons from a formation with a fluid containing a miscible solvent.

Improved compositions and/or techniques for secondary and/or tertiary recovery of hydrocarbons.

Improved systems and methods for enhanced oil recovery.

Improved systems and methods for enhanced oil recovery using a miscible solvent.

Improved systems and methods for enhanced oil recovery using a compound which is miscible with oil in place.

Improved systems and methods for enhanced oil recovery using a compound which is miscible with oil in place in combination with a gas.

Improved systems and methods for enhanced oil recovery using gravity drainage.

DETAILED DESCRIPTION OF THE INVENTION

Figure 2A:
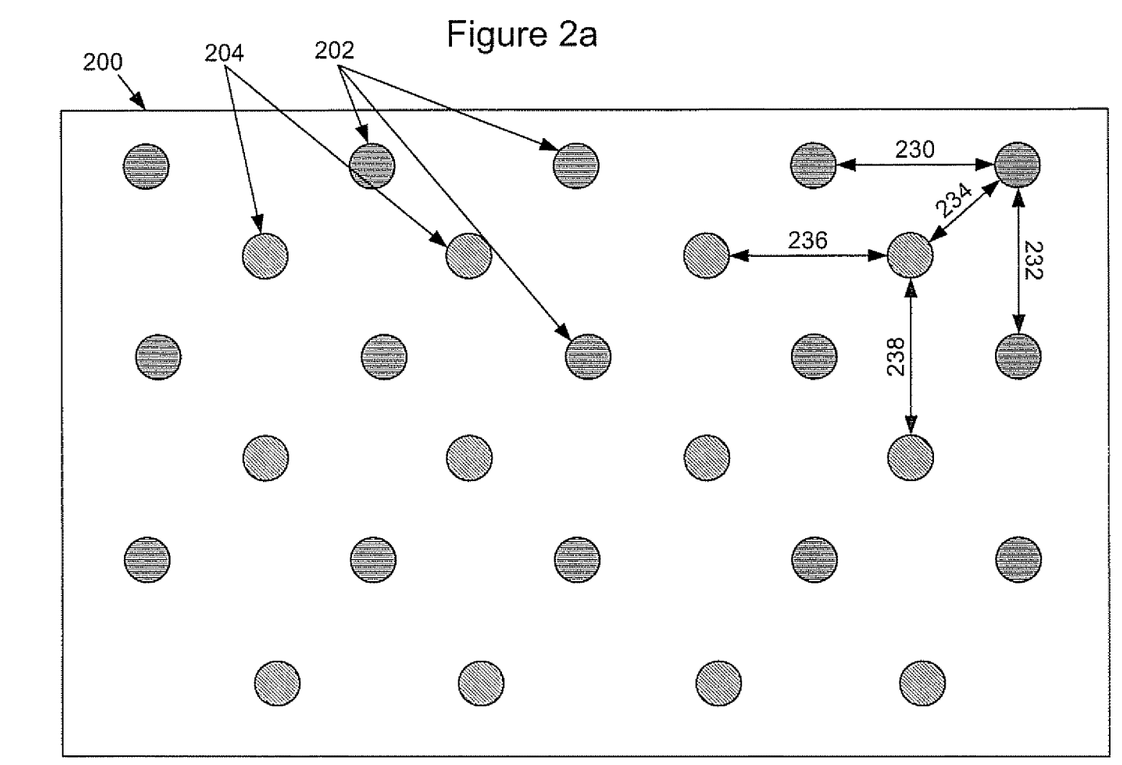
FIG. 2a illustrates a well pattern.
Figure 2B:
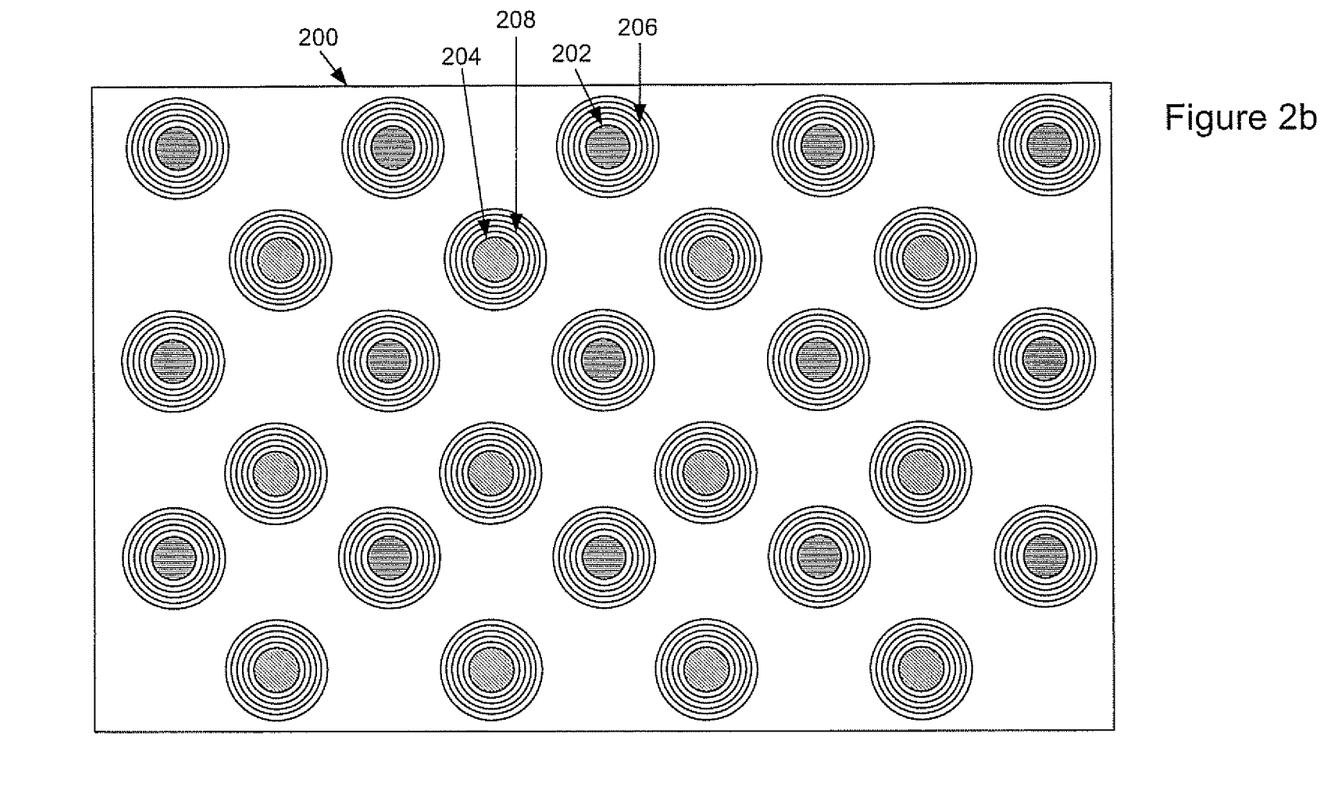
FIGS. 2b and 2c illustrate the well pattern of FIG. 2a during enhanced oil recovery processes.

FIG. 2a:
Referring now to FIG. 2a, 2b in some embodiments, an array of wells 200 is illustrated. Array 200 includes well group 202 (denoted by horizontal lines) and well group 204 (denoted by diagonal lines).

Each well in well group 202 has horizontal distance 230 from the adjacent well in well group 202. Each well in well group 202 has vertical distance 232 from the adjacent well in well group 202.

Each well in well group 204 has horizontal distance 236 from the adjacent well in well group 204. Each well in well group 204 has vertical distance 238 from the adjacent well in well group 204.

Each well in well group 202 is distance 234 from the adjacent wells in well group 204. Each well in well group 204 is distance 234 from the adjacent wells in well group 202.

In some embodiments, each well in well group 202 is surrounded by four wells in well group 204. In some embodiments, each well in well group 204 is surrounded by four wells in well group 202.

In some embodiments, horizontal distance 230 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, vertical distance 232 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, horizontal distance 236 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, vertical distance 238 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, distance 234 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, array of wells 200 may have from about 10 to about 1000 wells, for example from about 5 to about 500 wells in well group 202, and from about 5 to about 500 wells in well group 204.

In some embodiments, array of wells 200 is seen as a top view with well group 202 and well group 204 being vertical wells spaced on a piece of land. In some embodiments, array of wells 200 is seen as a cross-sectional side view with well group 202 and well group 204 being horizontal wells spaced within a formation.

The recovery of oil and/or gas with array of wells 200 from an underground formation may be accomplished by any known method. Suitable methods include subsea production, surface production, primary, secondary, or tertiary production. The selection of the method used to recover the oil and/or gas from the underground formation is not critical.

In some embodiments, oil and/or gas may be recovered from a formation into a well, and flow through the well and flowline to a facility. In some embodiments, enhanced oil recovery, with the use of an agent for example steam, water, a surfactant, a polymer flood, and/or a miscible agent such as a carbon disulfide formulation and/or carbon dioxide, may be used to increase the flow of oil and/or gas from the formation.

In some embodiments, oil and/or gas recovered from a formation may include a sulfur compound. The sulfur compound may include hydrogen sulfide, mercaptans, sulfides and disulfides other than hydrogen disulfide, or heterocyclic sulfur compounds for example thiophenes, benzothiophenes, or substituted and condensed ring dibenzothiophenes, or mixtures thereof.

In some embodiments, a sulfur compound from the formation may be converted into a carbon disulfide formulation. The conversion of at least a portion of the sulfur compound into a carbon disulfide formulation may be accomplished by any known method. Suitable methods may include oxidation reaction of the sulfur compound to sulfur and/or sulfur dioxides, and by reaction of sulfur and/or sulfur dioxide with carbon and/or a carbon containing compound to form the carbon disulfide formulation. The selection of the method used to convert at least a portion of the sulfur compound into a carbon disulfide formulation is not critical.

In some embodiments, a suitable miscible enhanced oil recovery agent may be a carbon disulfide formulation or a carbon oxysulfide formulation. The carbon disulfide formulation may include carbon disulfide and/or carbon disulfide derivatives for example, thiocarbonates, xanthates and mixtures thereof; and optionally one or more of the following: hydrogen sulfide, sulfur, carbon dioxide, hydrocarbons, and mixtures thereof.

In some embodiments, a suitable method of producing a carbon disulfide formulation is disclosed in copending U.S. patent application having Ser. No. 11/409,436, filed on Apr. 19, 2006. U.S. patent application having Ser. No. 11/409,436 is herein incorporated by reference in its entirety.

One suitable method of converting liquid sulfur and a hydrocarbon into a carbon disulfide formulation in the absence of oxygen is disclosed in WO 2007/131976. WO 2007/131976 is herein incorporated by reference in its entirety.

One suitable method of converting liquid sulfur and a hydrocarbon into a carbon disulfide formulation in the presence of oxygen is disclosed in WO 2007/131977. WO 2007/131977 is herein incorporated by reference in its entirety.

Other suitable methods for converting sulfur compounds into a carbon disulfide formulation and/or a carbon oxysulfide formulation are disclosed in co-pending patent applications: U.S. Patent Publication 2006/0254769; U.S. Provisional Application 61/031,832; U.S. Provisional Application 61/024,694; PCT Patent Publication WO 2007/131976; PCT Patent Publication WO 2008/003732; PCT Patent Publication WO 2007/131977; and PCT Patent Application PCT/EP2007/059746, which are all herein incorporated by reference in their entirety.

FIG. 2b:

Referring now to FIG. 2b, in some embodiments, array of wells 200 is illustrated. Array 200 includes well group 202 (denoted by horizontal lines) and well group 204 (denoted by diagonal lines).

In some embodiments, a miscible enhanced oil recovery agent is injected into well group 204, and oil is recovered from well group 202. As illustrated, the miscible enhanced oil recovery agent has injection profile 208, and oil recovery profile 206 is being produced to well group 202.

In some embodiments, a miscible enhanced oil recovery agent is injected into well group 202, and oil is recovered from well group 204. As illustrated, the miscible enhanced oil recovery agent has injection profile 206, and oil recovery profile 208 is being produced to well group 204.

In some embodiments, well group 202 may be used for injecting a miscible enhanced oil recovery agent, and well group 204 may be used for producing oil and/or gas from the formation for a first time period; then well group 204 may be used for injecting a miscible enhanced oil recovery agent, and well group 202 may be used for producing oil and/or gas from the formation for a second time period, where the first and second time periods comprise a cycle.

In some embodiments, multiple cycles may be conducted which include alternating well groups 202 and 204 between injecting a miscible enhanced oil recovery agent, and producing oil and/or gas from the formation, where one well group is injecting and the other is producing for a first time period, and then they are switched for a second time period.

In some embodiments, a cycle may be from about 12 hours to about 1 year, or from about 3 days to about 6 months, or from about 5 days to about 3 months. In some embodiments, each cycle may increase in time, for example each cycle may be from about 5% to about 10% longer than the previous cycle, for example about 8% longer.

In some embodiments, a miscible enhanced oil recovery agent or a mixture including a miscible enhanced oil recovery agent and a gas may be injected at the beginning of a cycle, and an immiscible enhanced oil recovery agent or a mixture including an immiscible enhanced oil recovery agent may be injected at the end of the cycle. In some embodiments, the beginning of a cycle may be the first 10% to about 80% of a cycle, or the first 20% to about 60% of a cycle, the first 25% to about 40% of a cycle, and the end may be the remainder of the cycle.

In some embodiments, suitable miscible enhanced oil recovery agents include carbon disulfide, hydrogen sulfide, carbon dioxide, octane, pentane, LPG, C2-C6 aliphatic hydrocarbons, nitrogen, diesel, mineral spirits, naptha solvent, asphalt solvent, kerosene, acetone, xylene, trichloroethane, or mixtures of two or more of the preceding, or other miscible enhanced oil recovery agents as are known in the art. In some embodiments, suitable miscible enhanced oil recovery agents are first contact miscible or multiple contact miscible with oil in the formation.

In some embodiments, suitable immiscible enhanced oil recovery agents include water in gas or liquid form, air, mixtures of two or more of the preceding, or other immiscible enhanced oil recovery agents as are known in the art. In some embodiments, suitable immiscible enhanced oil recovery agents are not first contact miscible or multiple contact miscible with oil in the formation.

In some embodiments, immiscible and/or miscible enhanced oil recovery agents injected into the formation may be recovered from the produced oil and/or gas and re-injected into the formation.

In some embodiments, oil as present in the formation prior to the injection of any enhanced oil recovery agents has a viscosity of at least about 100 centipoise, or at least about 500 centipoise, or at least about 1000 centipoise, or at least about 2000 centipoise, or at least about 5000 centipoise, or at least about 10,000 centipoise. In some embodiments, oil as present in the formation prior to the injection of any enhanced oil recovery agents has a viscosity of up to about 5,000,000 centipoise, or up to about 2,000,000 centipoise, or up to about 1,000,000 centipoise, or up to about 500,000 centipoise.

Figure 2C:
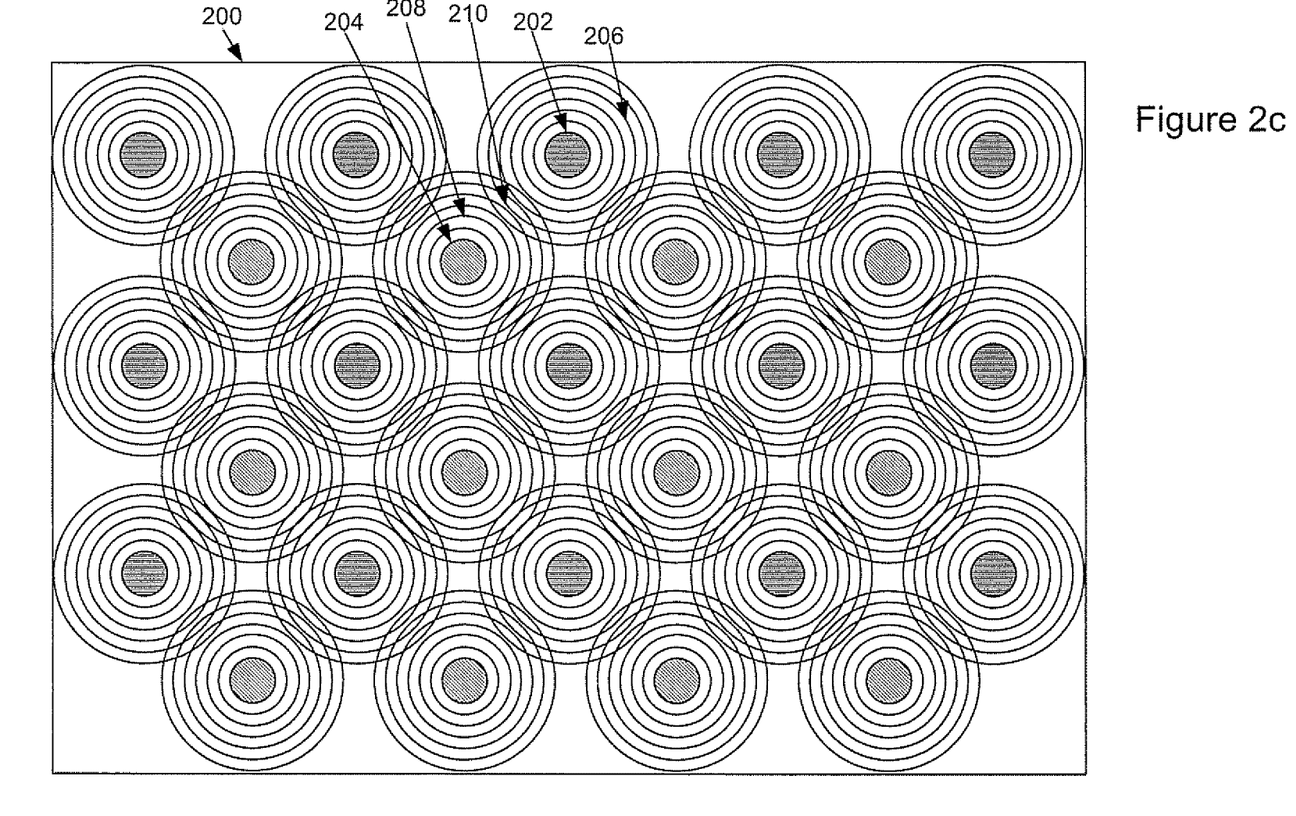

FIG. 2c:

Referring now to FIG. 2c, in some embodiments, array of wells 200 is illustrated. Array 200 includes well group 202 (denoted by horizontal lines) and well group 204 (denoted by diagonal lines).

In some embodiments, a miscible enhanced oil recovery agent is injected into well group 204, and oil is recovered from well group 202. As illustrated, the miscible enhanced oil recovery agent has injection profile 208 with overlap 210 with oil recovery profile 206, which is being produced to well group 202.

In some embodiments, a miscible enhanced oil recovery agent is injected into well group 202, and oil is recovered from well group 204. As illustrated, the miscible enhanced oil recovery agent has injection profile 206 with overlap 210 with oil recovery profile 208, which is being produced to well group 204.

Releasing at least a portion of the miscible enhanced oil recovery agent and/or other liquids and/or gases may be accomplished by any known method. One suitable method is injecting the miscible enhanced oil recovery formulation into a single conduit in a single well, allowing carbon disulfide formulation to soak, and then pumping out at least a portion of the carbon disulfide formulation with gas and/or liquids. Another suitable method is injecting the miscible enhanced oil recovery formulation into a first well, and pumping out at least a portion of the miscible enhanced oil recovery formulation with gas and/or liquids through a second well. The selection of the method used to inject at least a portion of the miscible enhanced oil recovery formulation and/or other liquids and/or gases is not critical.

In some embodiments, the miscible enhanced oil recovery formulation and/or other liquids and/or gases may be pumped into a formation at a pressure up to the fracture pressure of the formation.

In some embodiments, the miscible enhanced oil recovery formulation and a gas may be mixed in with oil and/or gas in a formation to form a mixture which may be recovered from a well. In some embodiments, a quantity of the miscible enhanced oil recovery formulation may be injected into a well, followed by another component to force the formulation across the formation. For example air, water in liquid or vapor form, carbon dioxide, other gases, other liquids, and/or mixtures thereof may be used to force the miscible enhanced oil recovery formulation across the formation.

In some embodiments, the miscible enhanced oil recovery formulation may be heated prior to being injected into the formation to lower the viscosity of fluids in the formation, for example heavy oils, paraffins, asphaltenes, etc.

In some embodiments, the miscible enhanced oil recovery formulation may be heated and/or boiled while within the formation, with the use of a heated fluid or a heater, to lower the viscosity of fluids in the formation. In some embodiments, heated water and/or steam may be used to heat and/or vaporize the miscible enhanced oil recovery formulation in the formation.

In some embodiments, the miscible enhanced oil recovery formulation may be heated and/or boiled while within the formation, with the use of a heater. One suitable heater is disclosed in copending U.S. patent application having Ser. No. 10/693,816, filed on Oct. 24, 2003. U.S. patent application having Ser. No. 10/693,816 is herein incorporated by reference in its entirety.

Figure 3A:
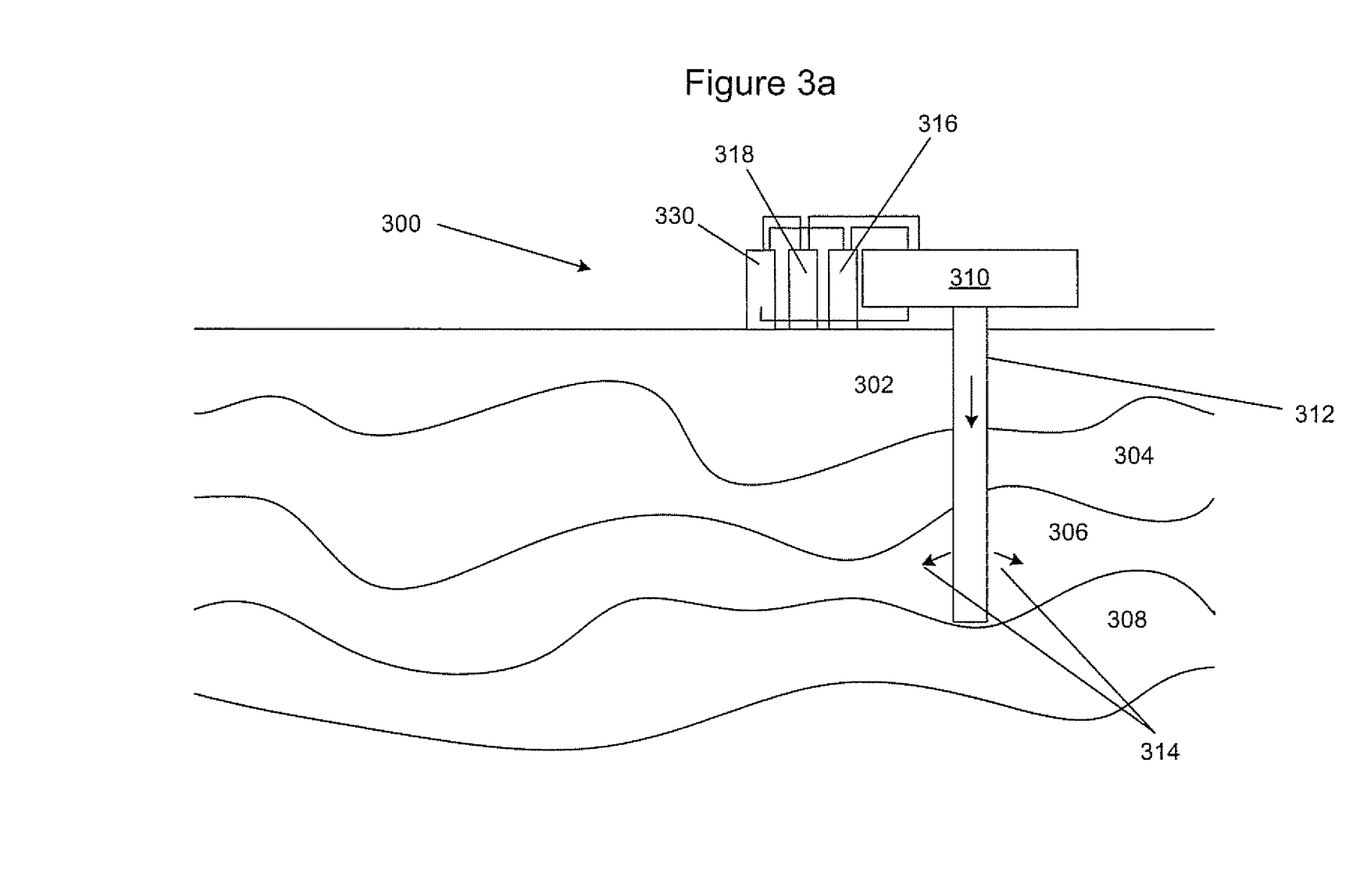
FIGS. 3a-3c illustrate oil and/or gas production systems.
Figure 3B:
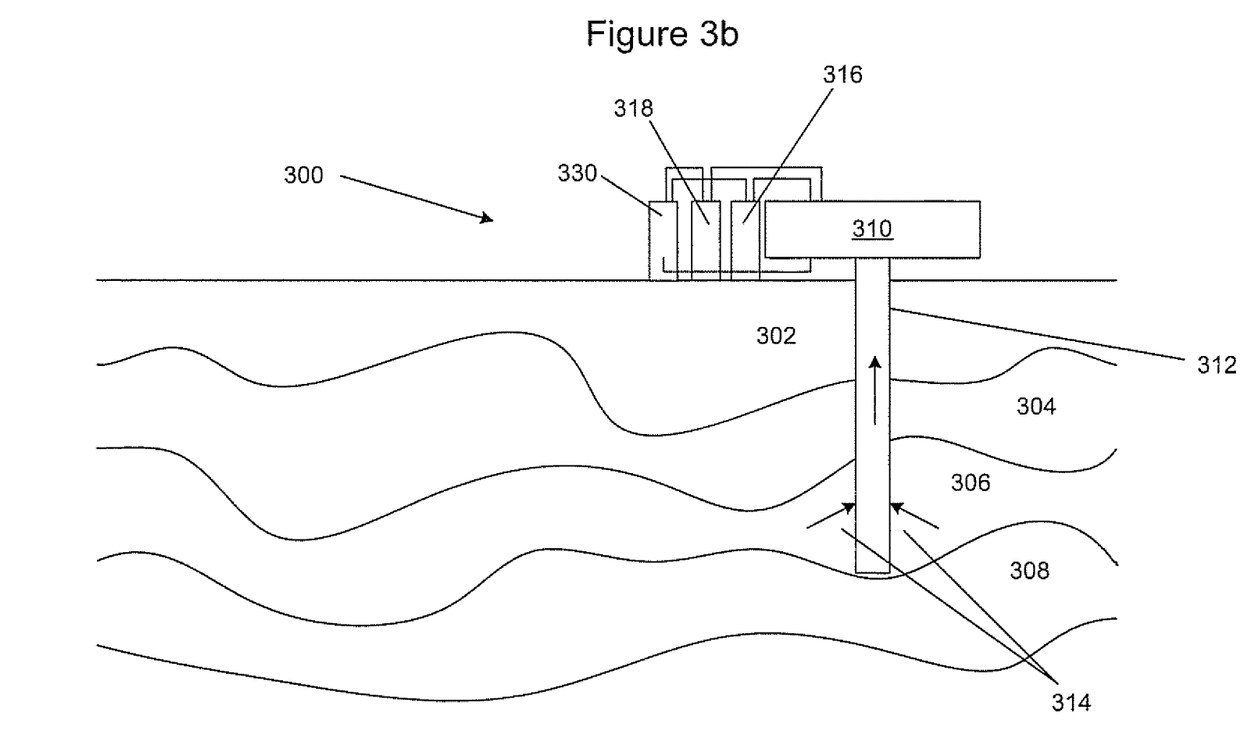

FIGS. 3a and 3b:

Referring now to FIGS. 3a and 3b, in some embodiments of the invention, system 300 is illustrated. System 300 includes underground formation 302, underground formation 304, underground formation 306, and underground formation 308. Facility 310 is provided at the surface. Well 312 traverses formations 302 and 304, and has openings in formation 306. Portions 314 of formation 306 may be optionally fractured and/or perforated. During primary production, oil and gas from formation 306 is produced into portions 314, into well 312, and travels up to facility 310. Facility 310 then separates gas, which is sent to gas processing 316, and liquids, which are sent to liquids storage/processing 318. Facility 310 also includes miscible enhanced oil recovery formulation storage 330. As shown in FIG. 3a, miscible enhanced oil recovery formulation and a gas may be pumped down well 312 that is shown by the down arrow and pumped into formation 306. Miscible enhanced oil recovery formulation and the gas may be left to soak in formation for a period of time from about 1 hour to about 15 days, for example from about 5 to about 50 hours.

After the soaking period, as shown in FIG. 3b, miscible enhanced oil recovery formulation and oil and/or gas are then produced back up well 312 to facility 310. Facility 310 may be adapted to separate and/or recycle miscible enhanced oil recovery formulation, for example by boiling the formulation, condensing it or filtering or reacting it, then re-injecting the formulation into well 312, for example by repeating the soaking cycle shown in FIGS. 3a and 3b from about 2 to about 5 times.

In some embodiments, miscible enhanced oil recovery formulation and the gas may be pumped into formation 306 below the fracture pressure of the formation, for example from about 40% to about 90% of the fracture pressure.

In some embodiments, well 312 as shown in FIG. 3a injecting into formation 306 may be representative of a well in well group 202, and well 312 as shown in FIG. 3b producing from formation 306 may be representative of a well in well group 204.

In some embodiments, well 312 as shown in FIG. 3a injecting into formation 306 may be representative of a well in well group 204, and well 312 as shown in FIG. 3b producing from formation 306 may be representative of a well in well group 202.

Figure 3C:
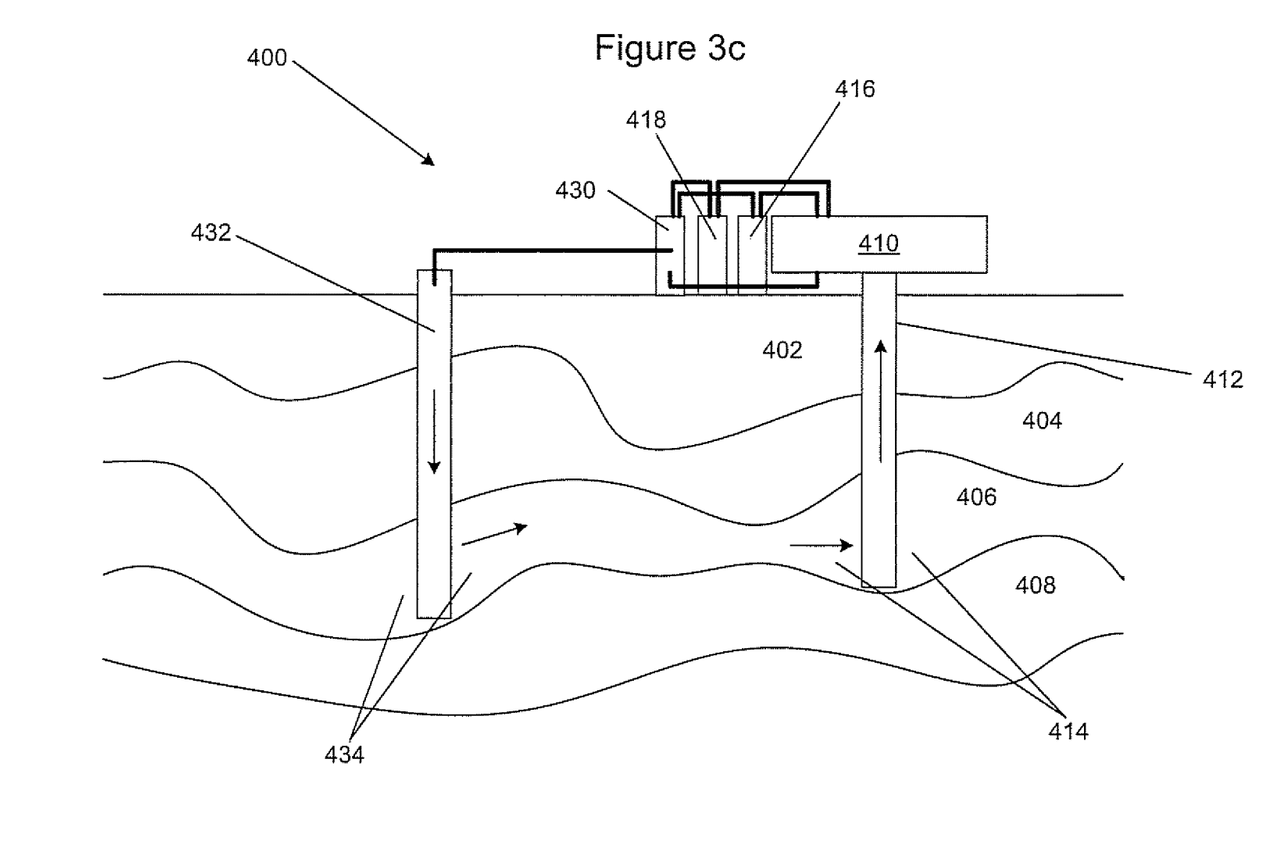

FIG. 3c:

Referring now to FIG. 3c, in some embodiments of the invention, system 400 is illustrated. System 400 includes underground formation 402, formation 404, formation 406, and formation 408. Production facility 410 is provided at the surface. Well 412 traverses formation 402 and 404 has openings at formation 406. Portions of formation 414 may be optionally fractured and/or perforated. As oil and gas is produced from formation 406 it enters portions 414, and travels up well 412 to production facility 410. Gas and liquid may be separated, and gas may be sent to gas storage 416, and liquid may be sent to liquid storage 418. Production facility 410 is able to produce and/or store miscible enhanced oil recovery formulation, which may be produced and stored in production/storage 430. Hydrogen sulfide and/or other sulfur containing compounds from well 412 may be sent to miscible enhanced oil recovery formulation production/storage 430. Miscible enhanced oil recovery formulation and a gas is pumped down well 432, to portions 434 of formation 406. Miscible enhanced oil recovery formulation and the gas traverses formation 406 to aid in the production of oil and gas, and then the miscible enhanced oil recovery formulation, oil and/or gas may all be produced to well 412, to production facility 410. Miscible enhanced oil recovery formulation may then be recycled, for example by boiling the formulation, condensing it or filtering or reacting it, then re-injecting the formulation into well 432.

In some embodiments, a quantity of miscible enhanced oil recovery formulation or miscible enhanced oil recovery formulation mixed with other components may be injected into well 432, followed by another component to force miscible enhanced oil recovery formulation or miscible enhanced oil recovery formulation mixed with other components across formation 406, for example air; water in gas or liquid form; water mixed with one or more salts, polymers, and/or surfactants; carbon dioxide; other gases; other liquids; and/or mixtures thereof.

In some embodiments, well 412 which is producing oil and/or gas is representative of a well in well group 202, and well 432 which is being used to inject miscible enhanced oil recovery formulation is representative of a well in well group 204.

In some embodiments, well 412 which is producing oil and/or gas is representative of a well in well group 204, and well 432 which is being used to inject miscible enhanced oil recovery formulation is representative of a well in well group 202.

Figure 4:
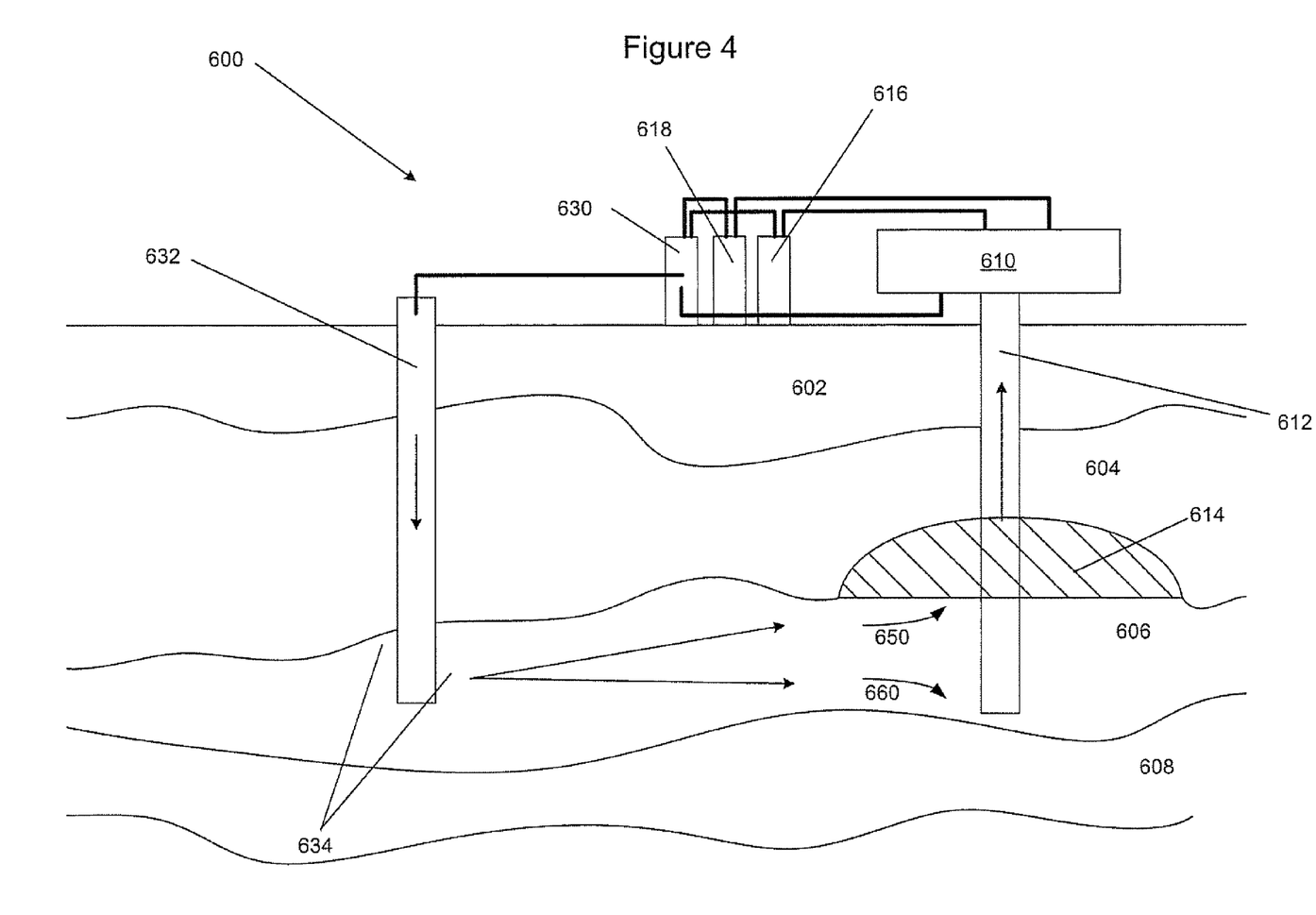
FIG. 4 illustrates an oil and/or gas production system.

FIG. 4:

Referring now to FIG. 4, in some embodiments of the invention, system 600 is illustrated. System 600 includes underground formation 602, formation 604, formation 606, and formation 608. Production facility 610 is provided at the surface. Well 612 traverses formation 602 and 604 has openings at formation 606. Portions of formation 606 form dome 614, which has trapped gas. As oil and/or gas is produced from formation 606, it travels up well 612 to production facility 610. Gases and liquids may be separated, and gas may be sent to gas storage 616, and liquid may be sent to liquid storage 618. Production facility 610 is able to produce and/or store enhanced oil recovery formulation, which may be produced and stored in production/storage 630. Hydrogen sulfide and/or other sulfur containing compounds from well 612 may be sent to enhanced oil recovery formulation production/storage 630.

Enhanced oil recovery formulation and a gas is pumped down well 632, to portions 634 of formation 606. Enhanced oil recovery formulation traverses formation 606 to aid in the production of oil as shown by arrow 660, and then the enhanced oil recovery formulation and oil may be produced to well 612, to production facility 610. Enhanced oil recovery formulation may then be recycled, for example by boiling the formulation, condensing it or filtering or reacting it, then re-injecting the formulation into well 632. The gas that is pumped down well 632 traverses formation 606 to form a gas cap in dome 614 as shown by arrow 660. As the size and/or pressure of the gas cap in dome 614 increases, more oil may be forced into well 612 by gravity drainage.

In some embodiments, enhanced oil recovery formulation includes carbon disulfide or carbon disulfide formulations. In some embodiments, the injected gas includes carbon dioxide, nitrogen, or mixtures including carbon dioxide or nitrogen.

In some embodiments, a mixture including carbon disulfide and carbon dioxide is injected into formation 606, so that the carbon disulfide mixes with the oil in place and is produced to well 612, and the carbon dioxide floats to dome 614 to form a gas cap, which causes gravity drainage of the carbon disulfide and/or oil and/or other liquids to well 612.

In some embodiments, as a carbon disulfide—carbon dioxide mixture mixes with oil, the carbon dioxide is released to form a gas cap, and the carbon disulfide—oil mixture flows down by gravity to be produced to well 612.

In some embodiments, a quantity of enhanced oil recovery formulation or enhanced oil recovery formulation mixed with other components may be injected into well 632, followed by another component to force enhanced oil recovery formulation or enhanced oil recovery formulation mixed with other components across formation 606, for example air; water in gas or liquid form; water mixed with one or more salts, polymers, and/or surfactants; one or more gases; other liquids; and/or mixtures thereof.

In some embodiments, well 612 which is producing oil and/or gas is representative of a well in well group 202, and well 632 which is being used to inject enhanced oil recovery formulation is representative of a well in well group 204.

In some embodiments, well 612 which is producing oil and/or gas is representative of a well in well group 204, and well 632 which is being used to inject enhanced oil recovery formulation is representative of a well in well group 202.

Figure 5:
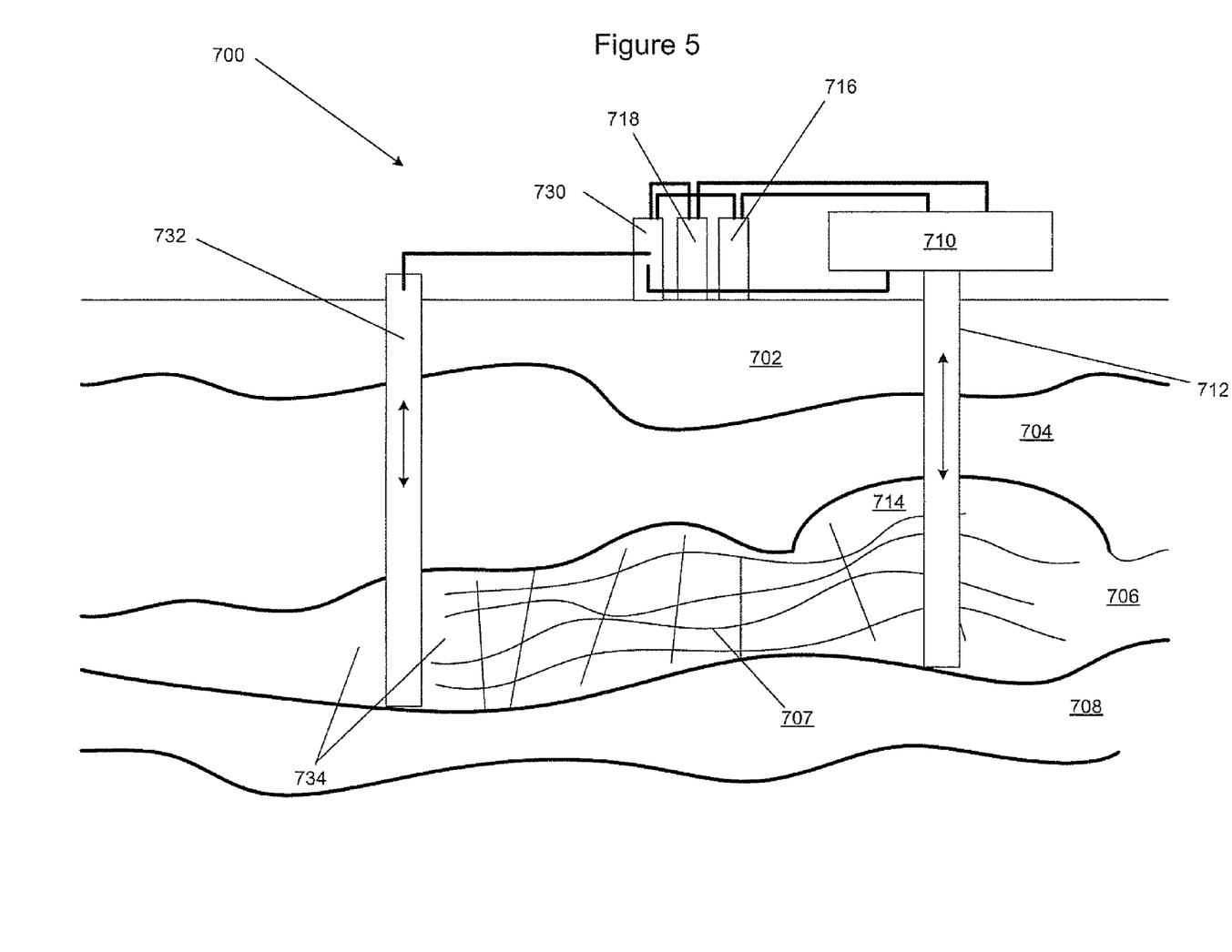
FIG. 5 illustrates an oil and/or gas production system.

FIG. 5:

Referring now to FIG. 5, in some embodiments of the invention, system 700 is illustrated. System 700 includes underground formation 702, formation 704, formation 706, and formation 708. Production facility 710 is provided at the surface. Well 712 traverses formation 702 and 704 has openings at formation 706. Portions of formation 706 form dome 714, which may trap less dense liquids and/or gases. Formation 706 has fractures and/or vugs 707 which provide a low resistance fluid path from well 712 to well 732, and vice versa. As liquids and/or gases are produced from formation 706, they travel up well 712 to production facility 710. Gas and liquid may be separated, and gas may be sent to gas processing/storage 716, and liquid may be sent to liquid processing/storage 718. Production facility 710 is able to produce and/or store miscible enhanced oil recovery formulation, which may be produced and stored in production/storage 730. Hydrogen sulfide and/or other sulfur containing compounds from well 712 may be sent to miscible enhanced oil recovery formulation production/storage 730.

Miscible enhanced oil recovery formulation and a gas is pumped down well 732, to portions 734 of formation 706. Miscible enhanced oil recovery formulation and the gas traverses formation 706 to aid in the production of oil and/or gas from fractures and/or vugs 707 and the matrix, and then the miscible enhanced oil recovery formulation and oil and/or gas may all be produced to well 712, to production facility 710. Miscible enhanced oil recovery formulation may then be recycled, for example by boiling the formulation, condensing it or filtering or reacting it, then re-injecting the formulation into well 732.

The miscible enhanced oil recovery formulation and gas injection rates may be adjusted to be near the imbibition rate of the formulation and gas into the matrix surrounding the fractures and/or vugs 707. In the matrix, a phase splitting may occur when the formulation/gas mixture mixes with oil in the matrix, releasing the gas to float to the top of the matrix forming a gas cap, and forming a formulation/oil mixture, which flows to the bottom of the matrix by gravity drainage, and then drains into the fractures and/or vugs 707.

In some embodiments, miscible enhanced oil recovery formulation includes carbon disulfide or carbon disulfide formulations. In some embodiments, the gas includes carbon dioxide, nitrogen, or mixtures including carbon dioxide or nitrogen.

In some embodiments, a quantity of miscible enhanced oil recovery formulation and a gas may be injected into wells 712 and/or 732, followed by another component to force the formulation and the gas across formation 706, for example air; water in gas or liquid form; water mixed with one or more salts, polymers, and/or surfactants; gases; other liquids; and/or mixtures thereof.

In some embodiments, well 712 which is producing oil and/or gas is representative of a well in well group 202, and well 732 which is being used to inject miscible enhanced oil recovery formulation is representative of a well in well group 204. In some embodiments, well 712 which is producing oil and/or gas is representative of a well in well group 204, and well 732 which is being used to inject miscible enhanced oil recovery formulation is representative of a well in well group 202.

In some embodiments, oil and/or gas produced may be transported to a refinery and/or a treatment facility. The oil and/or gas may be processed to produced to produce commercial products such as transportation fuels such as gasoline and diesel, heating fuel, lubricants, chemicals, and/or polymers. Processing may include distilling and/or fractionally distilling the oil and/or gas to produce one or more distillate fractions. In some embodiments, the oil and/or gas, and/or the one or more distillate fractions may be subjected to a process of one or more of the following: catalytic cracking, hydrocracking, hydrotreating, coking, thermal cracking, distilling, reforming, polymerization, isomerization, alkylation, blending, and dewaxing.

ILLUSTRATIVE EMBODIMENTS

In one embodiment, there is disclosed a method for producing oil from an underground formation comprising injecting an enhanced oil recovery formulation and a gas into a first well in the formation; forming a mixture comprising the enhanced oil recovery formulation and the oil in the formation; forming a gas cap with the injected gas; forcing the formulation and oil mixture towards a second well in the formation; and producing the formulation and oil mixture from the second well. In some embodiments, the first well further comprises a first array of wells, and the second well further comprises a second array of wells, wherein a well in the first array of wells is at a distance of 10 meters to 1 kilometer from one or more adjacent wells in the second array of wells. In some embodiments, the underground formation is beneath a body of water. In some embodiments, the enhanced oil recovery formulation comprises a miscible enhanced oil recovery formulation, further comprising a mechanism for injecting an immiscible enhanced oil recovery formulation into the formation, after the miscible enhanced oil recovery formulation has been injected into the formation. In some embodiments, the enhanced oil recovery formulation is selected from the group consisting of a carbon disulfide formulation, hydrogen sulfide, octane, pentane, LPG, C2-C6 aliphatic hydrocarbons, nitrogen, diesel, mineral spirits, naptha solvent, asphalt solvent, kerosene, acetone, xylene, trichloroethane, and mixtures thereof. In some embodiments, the immiscible enhanced oil recovery formulation selected from the group consisting of water in gas or liquid form, air, and mixtures thereof. In some embodiments, the first array of wells comprises from 5 to 500 wells, and the second array of wells comprises from 5 to 500 wells. In some embodiments, the enhanced oil recovery formulation comprises a carbon disulfide formulation, and the gas comprises carbon dioxide. In some embodiments, the enhanced oil recovery formulation comprises a carbon disulfide formulation, the method further comprising producing a carbon disulfide formulation. In some embodiments, the underground formation comprises an oil having a viscosity from 100 to 5,000,000 centipoise. In some embodiments, the enhanced oil recovery formulation is denser than the oil and/or gas. In some embodiments, the formulation and oil mixture is denser than the gas. In some embodiments, the gas comprises a gas selected from nitrogen and carbon dioxide, and mixtures thereof. In some embodiments, the gas floats on the enhanced oil recovery formulation and oil mixture.

In one embodiment, there is disclosed a method for producing oil and/or gas comprising injecting a miscible enhanced oil recovery formulation and a gas into fractures and/or vugs surrounding a matrix in a formation from a first well; imbibing the miscible enhanced oil recovery formulation and the gas into the matrix; forming an oil and miscible enhanced oil recovery formulation mixture in the matrix; forming a gas cap in the matrix with the injected gas; producing the oil and formulation mixture to the fractures and/or vugs; and producing the oil and formulation mixture from the fractures and/or vugs from a second well. In some embodiments, the method also includes converting at least a portion of the recovered oil and/or gas into a material selected from the group consisting of transportation fuels such as gasoline and diesel, heating fuel, lubricants, chemicals, and/or polymers. In some embodiments, the miscible enhanced oil recovery formulation comprises a carbon disulfide formulation. In some embodiments, injecting the miscible enhanced oil recovery formulation comprises injecting a carbon disulfide formulation into the formation in a mixture with one or more of hydrocarbons; sulfur compounds other than carbon disulfide; carbon monoxide; or mixtures thereof. In some embodiments, the method also includes heating the miscible enhanced oil recovery formulation prior to injecting the formulation into the formation, or while within the formation. In some embodiments, the miscible enhanced oil recovery formulation is injected at a pressure from 0 to 37,000 kilopascals above the initial reservoir pressure, measured prior to when the injection begins. In some embodiments, the underground formation comprises a permeability from 0.0001 to 15 Darcies, for example a permeability from 0.001 to 1 Darcy. In some embodiments, any oil, as present in the underground formation prior to the injecting the formulation, has a viscosity from 5000 to 2,000,000 centipoise, for example from 10,000 to 500,000 centipoise.

Those of skill in the art will appreciate that many modifications and variations are possible in terms of the disclosed embodiments of the invention, configurations, materials and methods without departing from their spirit and scope. Accordingly, the scope of the claims appended hereafter and their functional equivalents should not be limited by particular embodiments described and illustrated herein, as these are merely exemplary in nature.

The invention claimed is:

1. A method for producing oil from an underground formation comprising:
    injecting an enhanced oil recovery formulation and an immiscible gas into a first well in the formation, wherein the enhanced oil recovery formulation comprises a material selected from the group consisting of carbon disulfide, hydrogen sulfide, octane, pentane, diesel, mineral spirits, naptha solvent, asphalt solvent, kerosene, acetone, xylene, trichloroethane, and mixtures thereof;
    forming a mixture comprising the enhanced oil recovery formulation and the oil in the formation;
    forming a gas cap with the injected immiscible gas;
    forcing the formulation and oil mixture towards a second well in the formation; and
    producing the formulation and oil mixture from the second well.

2. The method of claim 1, wherein the first well further comprises a first array of wells, and the second well further comprises a second array of wells, wherein a well in the first array of wells is at a distance of 10 meters to 1 kilometer from one or more adjacent wells in the second array of wells.

3. The method of claim 2, wherein the first array of wells comprises from 5 to 500 wells, and the second array of wells comprises from 5 to 500 wells.

4. The method of claim 1, wherein the method enhanced oil recovery formulation comprises a miscible enhanced oil recovery formulation, further comprising a mechanism for injecting an immiscible enhanced oil recovery formulation into the formation, after the miscible enhanced oil recovery formulation has been injected into the formation.

5. The method of claim 4, wherein the immiscible enhanced oil recovery formulation selected from the group consisting of water in gas or liquid form, air, and mixtures thereof.

6. The method of claim 1, further comprising producing and then injecting a carbon disulfide formulation.

7. The method of claim 1, wherein the underground formation comprises an oil having a viscosity from 100 to 5,000,000 centipoise.

8. The method of claim 1, wherein the enhanced oil recovery formulation is denser than the oil and/or gas.

9. The method of claim 1, wherein the formulation and oil mixture is denser than the gas.

10. The method of claim 1, wherein the gas comprises a gas selected from nitrogen and carbon dioxide, and mixtures thereof.

11. The method of claim 1, wherein the gas floats on the enhanced oil recovery formulation and oil mixture.

12. A method for producing oil and/or gas comprising:
    injecting a miscible enhanced oil recovery formulation and an immiscible gas into fractures and/or vugs surrounding a matrix in a formation from a first well;
    imbibing the miscible enhanced oil recovery formulation and the immiscible gas into the matrix;
    forming an oil and miscible enhanced oil recovery formulation mixture in the matrix;
    forming an immiscible gas cap in the matrix with the injected immiscible gas;
    producing the oil and formulation mixture to the fractures and/or vugs; and
    producing the oil and formulation mixture from the fractures and/or vugs from a second well.

13. The method of claim 12, further comprising converting at least a portion of the recovered oil and/or gas into a material selected from the group consisting of transportation fuels such as gasoline and diesel, heating fuel, lubricants, chemicals, and/or polymers.

14. The method of claim 12, wherein injecting the miscible enhanced oil recovery formulation comprises injecting a carbon disulfide formulation into the formation in a mixture with one or more of hydrocarbons; sulfur compounds other than carbon disulfide; carbon monoxide; or mixtures thereof.

15. The method of claim 12, further comprising heating the miscible enhanced oil recovery formulation prior to injecting the formulation into the formation, or while within the formation.

16. The method of claim 12, wherein the miscible enhanced oil recovery formulation is injected at a pressure from 0 to 37,000 kilopascals above the initial reservoir pressure, measured prior to when the injection begins.

17. The method of claim 12, wherein the underground formation comprises a permeability from 0.0001 to 15 Darcies, for example a permeability from 0.001 to 1 Darcy.

18. The method of claim 12, wherein any oil, as present in the underground formation prior to the injecting the formulation, has a viscosity from 5000 to 2,000,000 centipoise, for example from 10,000 to 500,000 centipoise.

* * * * *